(12) United States Patent
Jeong

(10) Patent No.: US 11,186,212 B2
(45) Date of Patent: Nov. 30, 2021

(54) HEADREST CONTROLLING APPARATUS

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 0 days.

(21) Appl. No.: 16/760,535

(22) PCT Filed: Jun. 18, 2018

(86) PCT No.: PCT/KR2018/006814
§ 371 (c)(1),
(2) Date: Apr. 30, 2020

(87) PCT Pub. No.: WO2019/098479
PCT Pub. Date: May 23, 2019

(65) Prior Publication Data
US 2021/0213861 A1    Jul. 15, 2021

(30) Foreign Application Priority Data

Nov. 17, 2017   (KR) .......................... 10-2017-0153624

(51) Int. Cl.
*B60N 2/85*       (2018.01)
*B60N 2/844*      (2018.01)

(52) U.S. Cl.
CPC ............... *B60N 2/85* (2018.02); *B60N 2/844* (2018.02)

(58) Field of Classification Search
CPC ......... B60N 2/856; B60N 2/844; B60N 2/841
(Continued)

(56) References Cited

U.S. PATENT DOCUMENTS

| 5,669,668 A * | 9/1997 | Leuchtmann | B60N 2/859 |
| | | | 297/408 |
| 7,984,951 B2 * | 7/2011 | Sayama | B60N 2/856 |
| | | | 297/408 |

(Continued)

FOREIGN PATENT DOCUMENTS

| KR | 20-0293229 Y1 | 10/2002 |
| KR | 20-0426352 Y1 | 9/2006 |

(Continued)

OTHER PUBLICATIONS

International Searching Authority/KR, International Search Report and Written Opinion of the International Searching Authority, Application No. PCT/KR2018/006814, dated Oct. 17, 2018, 7 pages.

*Primary Examiner* — Sarah B McPartlin
(74) *Attorney, Agent, or Firm* — Sunstein LLP

(57) ABSTRACT

The present invention relates to a headrest controlling apparatus, and more particularly, to a headrest controlling apparatus which includes a first fixing member installed on a first member, and a second fixing member installed in the second member to slide in a lateral direction and configured to fix a position of the headrest, wherein one of the first fixing member and the second fixing member includes a fixing groove formed in a lateral direction, the other one includes a fixing protrusion which is inserted into the fixing groove, and the second fixing member includes a first fixing member insertion groove formed to pass therethrough in a rotational direction of the second member so that the first fixing member is inserted thereinto, and thus has a simplified structure, and the first fixing member is fitted onto the first fixing member insertion groove when an occupant pushes the second fixing member to fold a headrest, and thus, (Continued)

convenience of use can be increased by not continuously pushing the second fixing member.

5 Claims, 11 Drawing Sheets

(58) Field of Classification Search
USPC .................................................. 297/408, 409
See application file for complete search history.

(56) References Cited

U.S. PATENT DOCUMENTS

| | | | |
|---|---|---|---|
| 8,246,116 B1 * | 8/2012 | Sutter, Jr. ............... | B60N 2/844 |
| | | | 297/408 |
| 8,857,910 B2 * | 10/2014 | Jeong, II ................ | B60N 2/806 |
| | | | 297/408 |

FOREIGN PATENT DOCUMENTS

| KR | 10-2009-0091904 A | 8/2009 |
|---|---|---|
| KR | 10-2013-0057395 A | 5/2013 |
| KR | 10-1274451 B1 | 6/2013 |
| KR | 10-1736736 B | 5/2017 |

* cited by examiner

[Fig. 1]
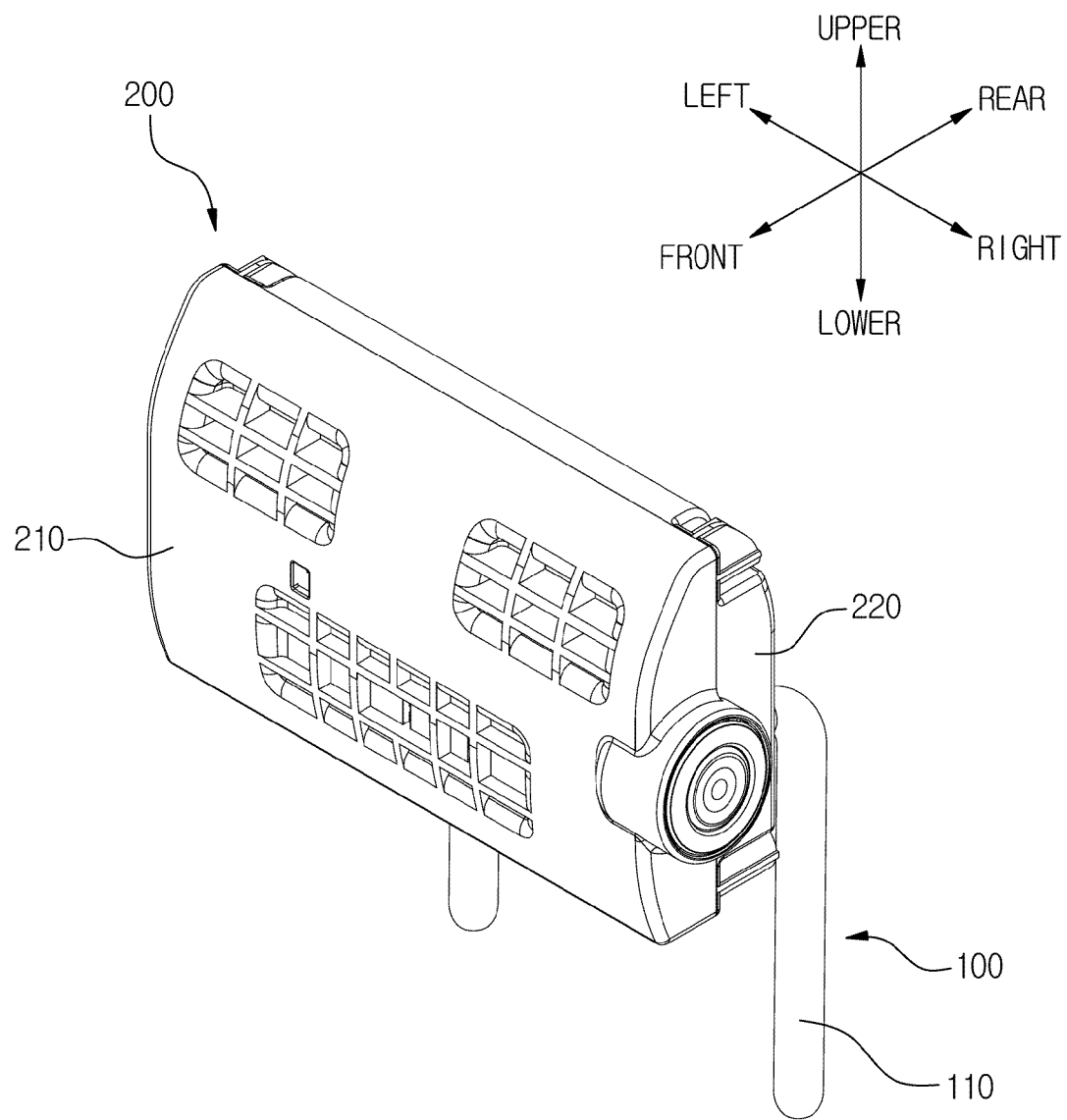

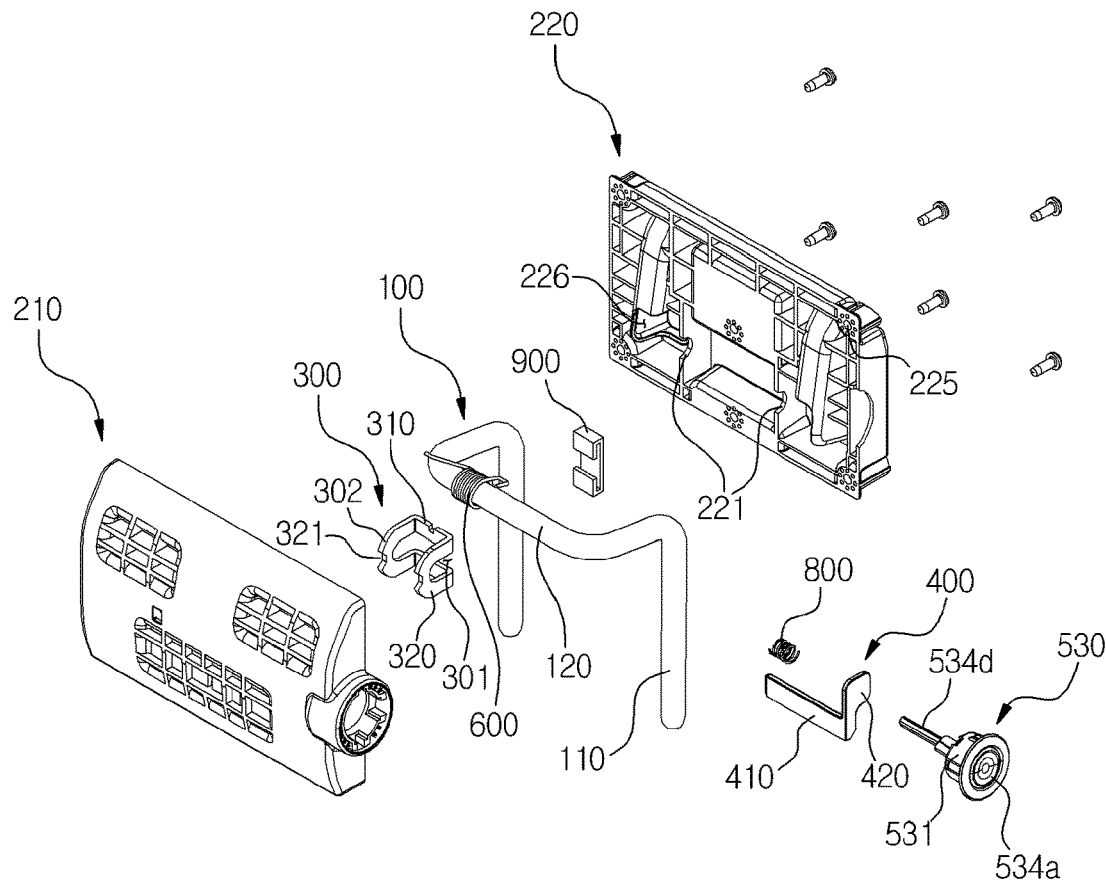
[Fig. 2]
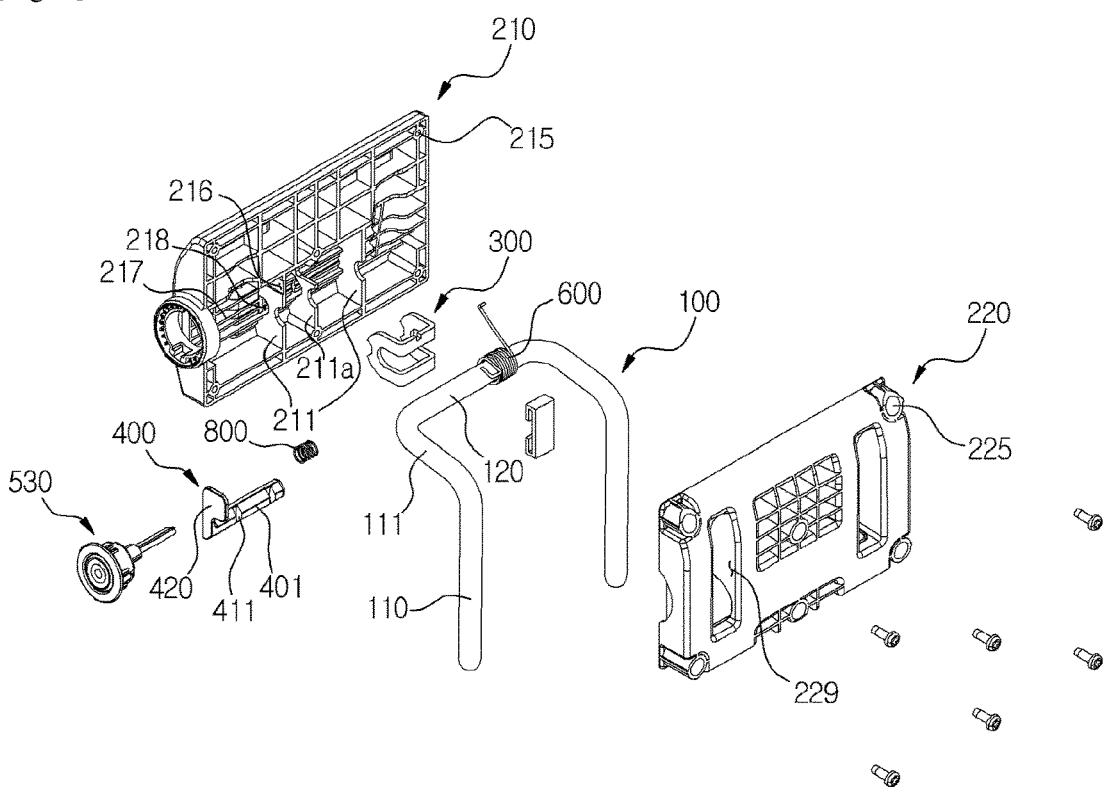
[Fig. 3]

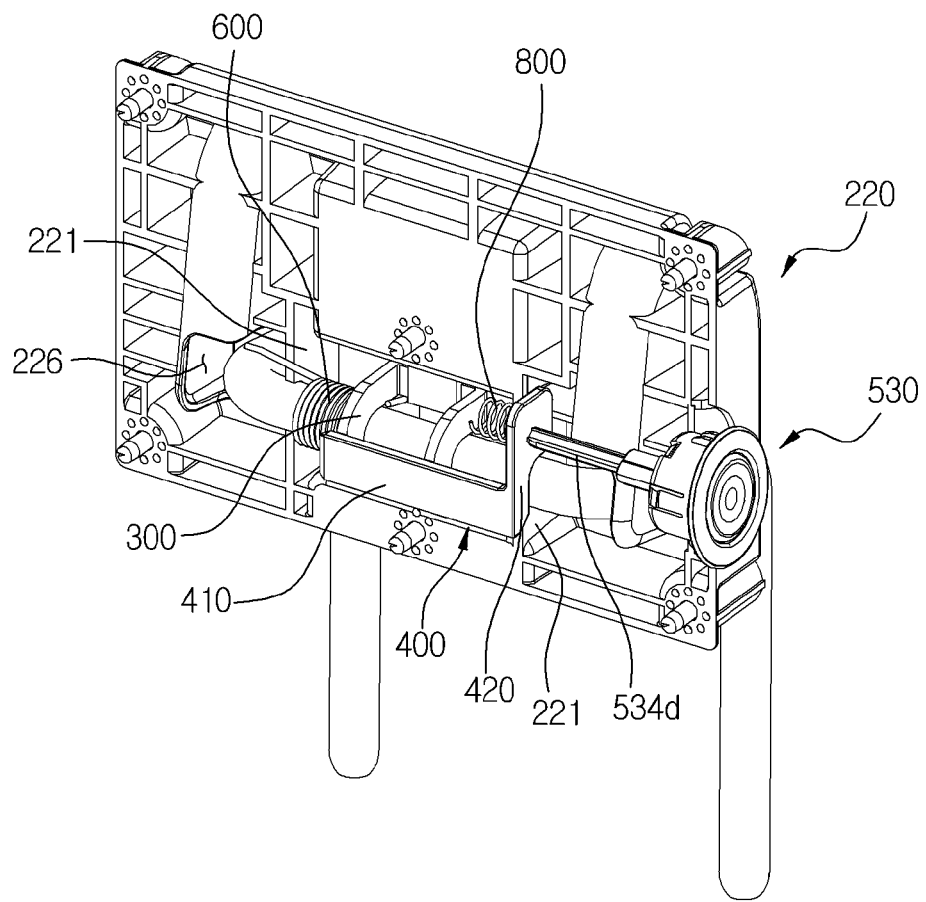
[Fig. 4]

[Fig. 5]
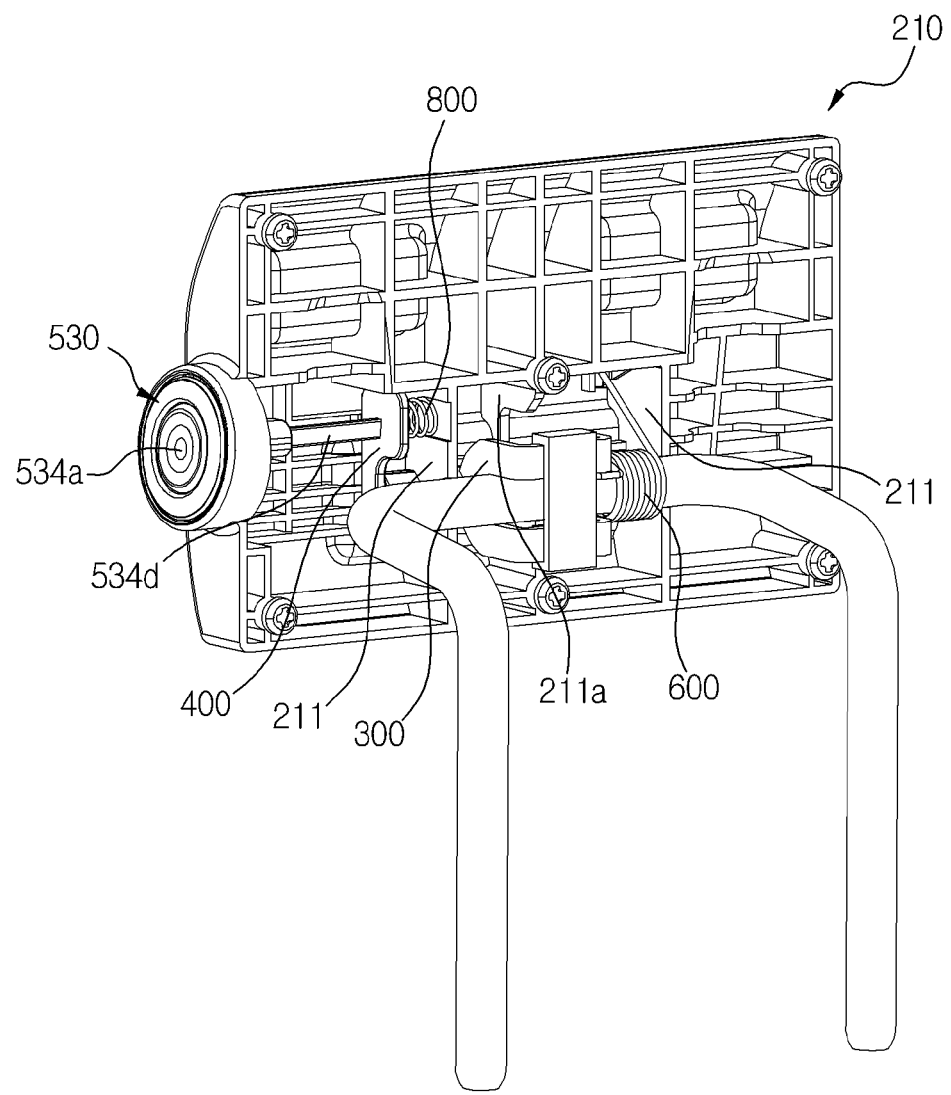

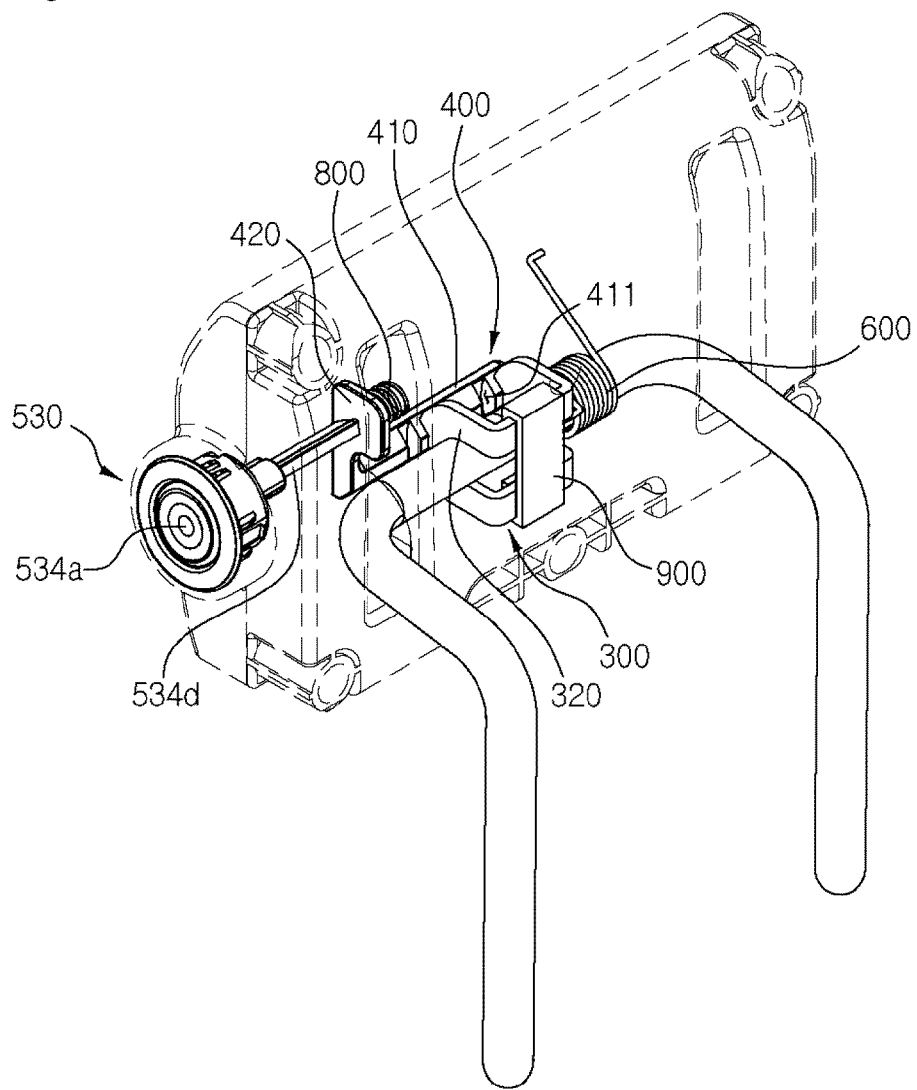
[Fig. 6]

[Fig. 7]
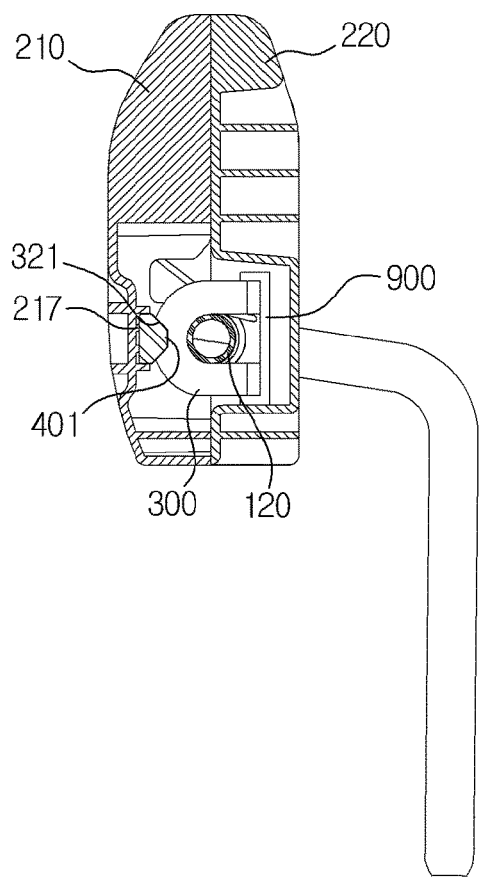
[Fig. 8]
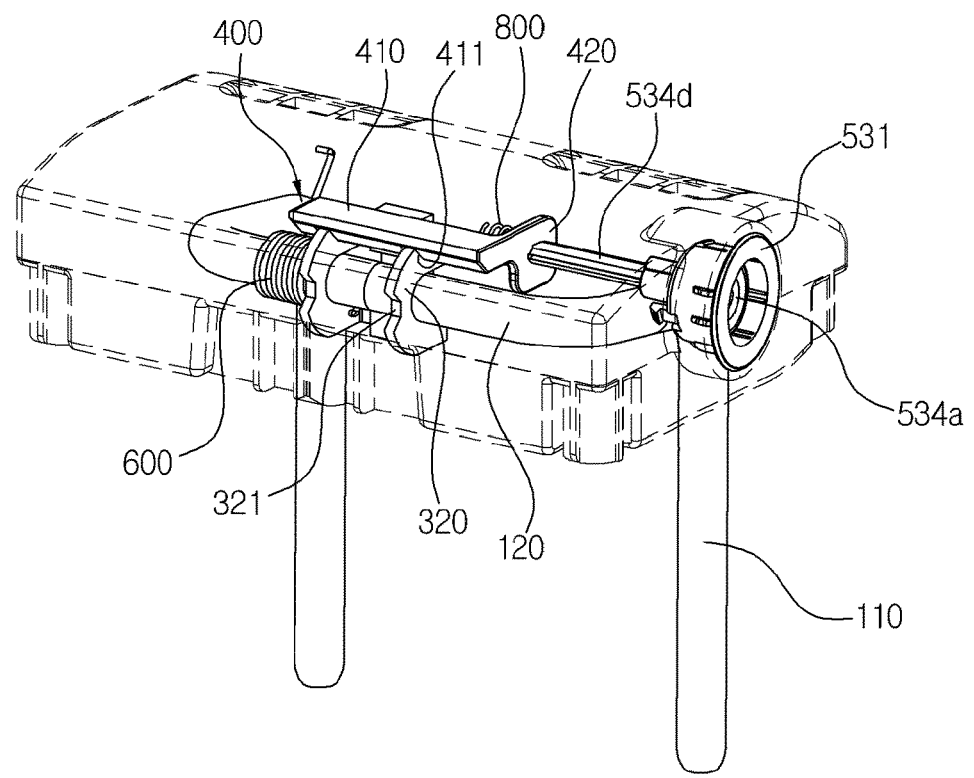

[Fig. 9]
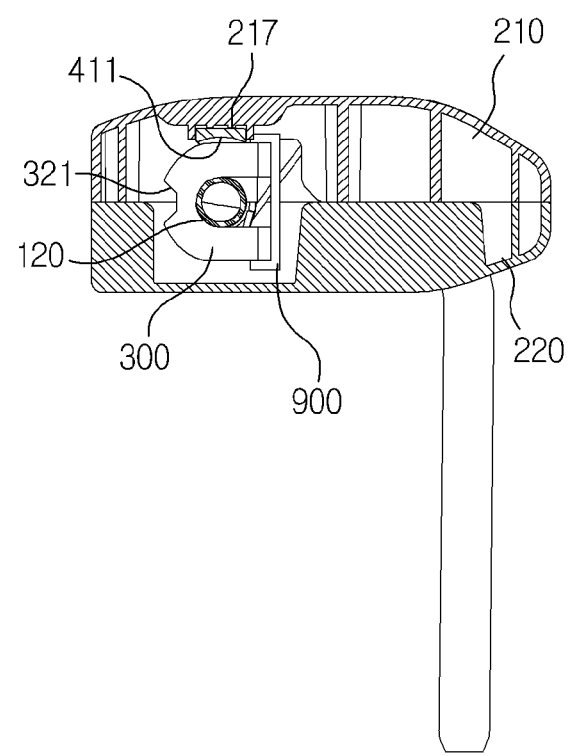

[Fig. 10]
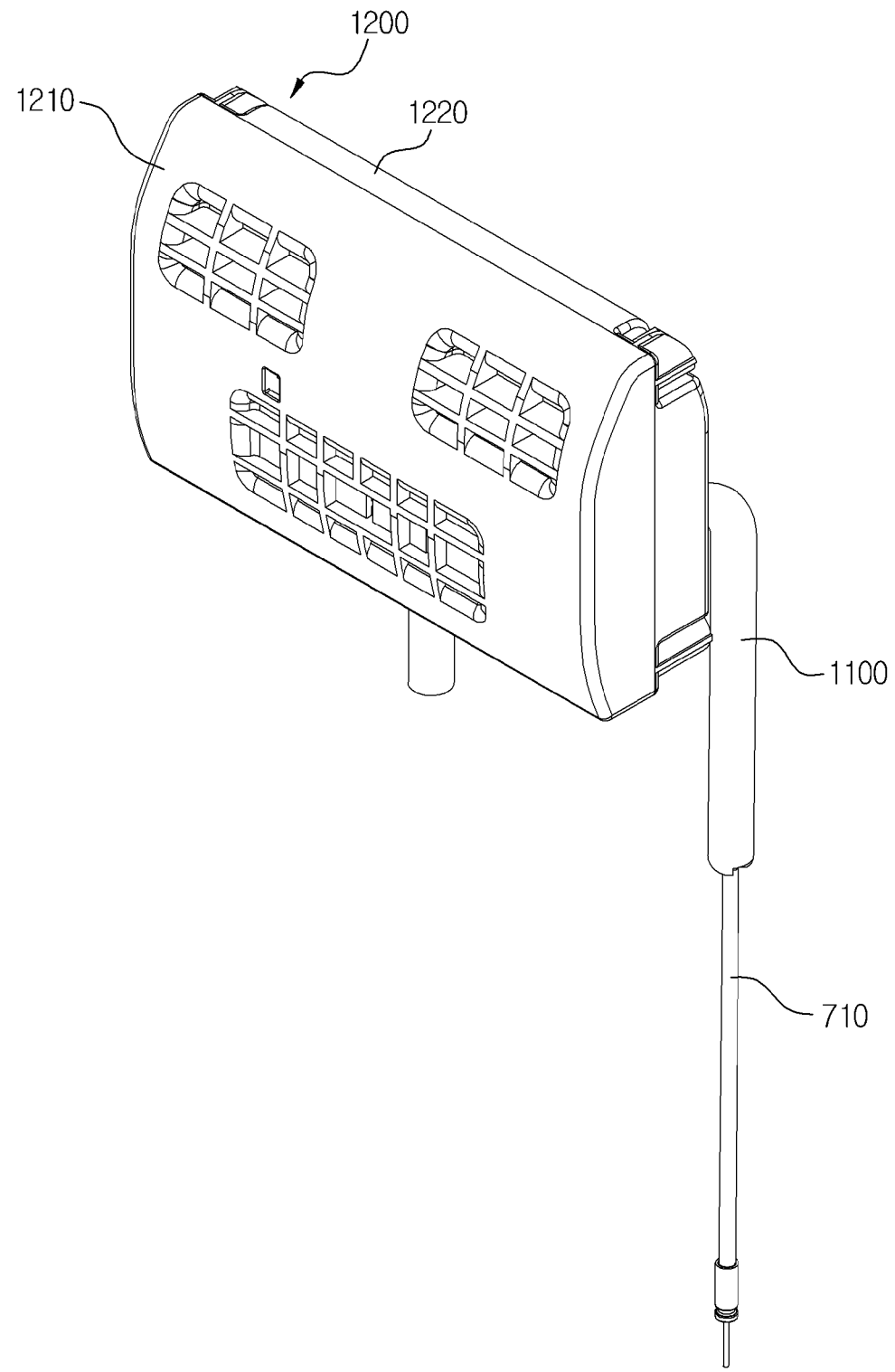

[Fig. 11]
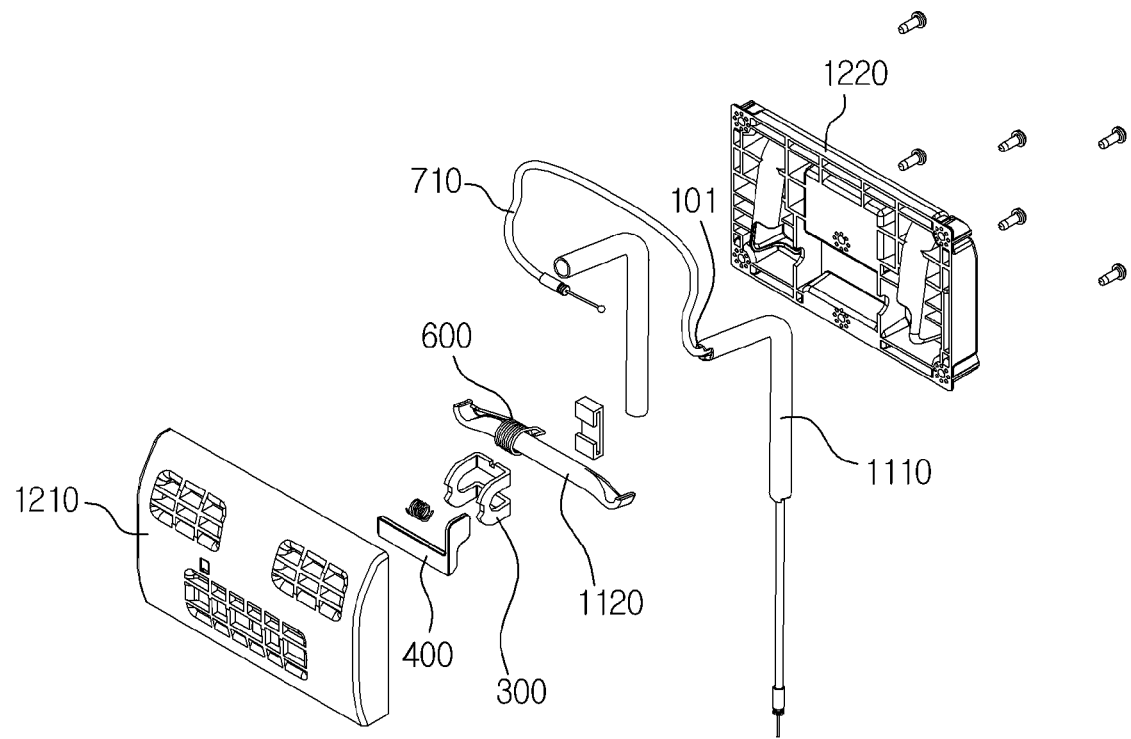

[Fig. 12]
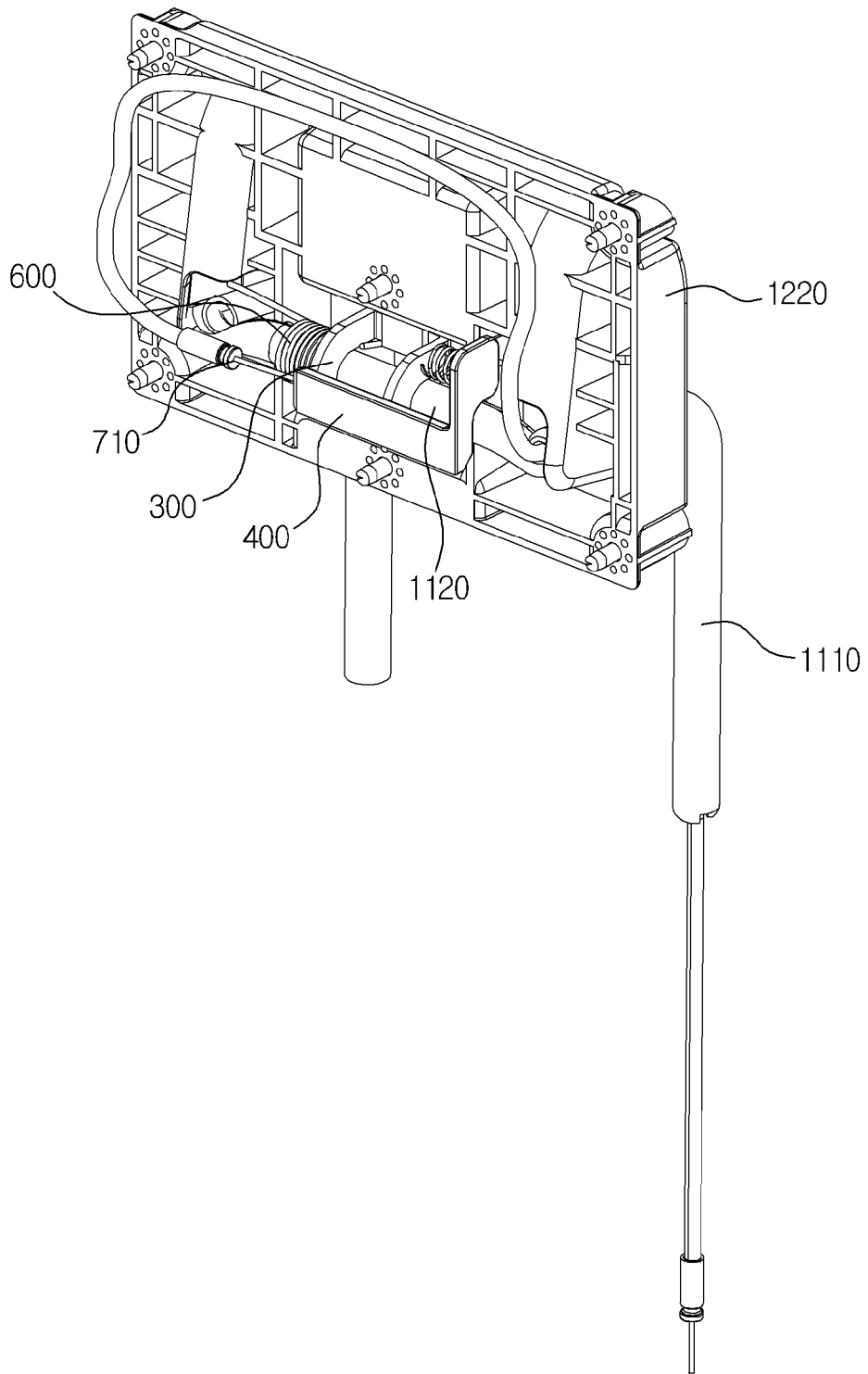

[Fig. 13]
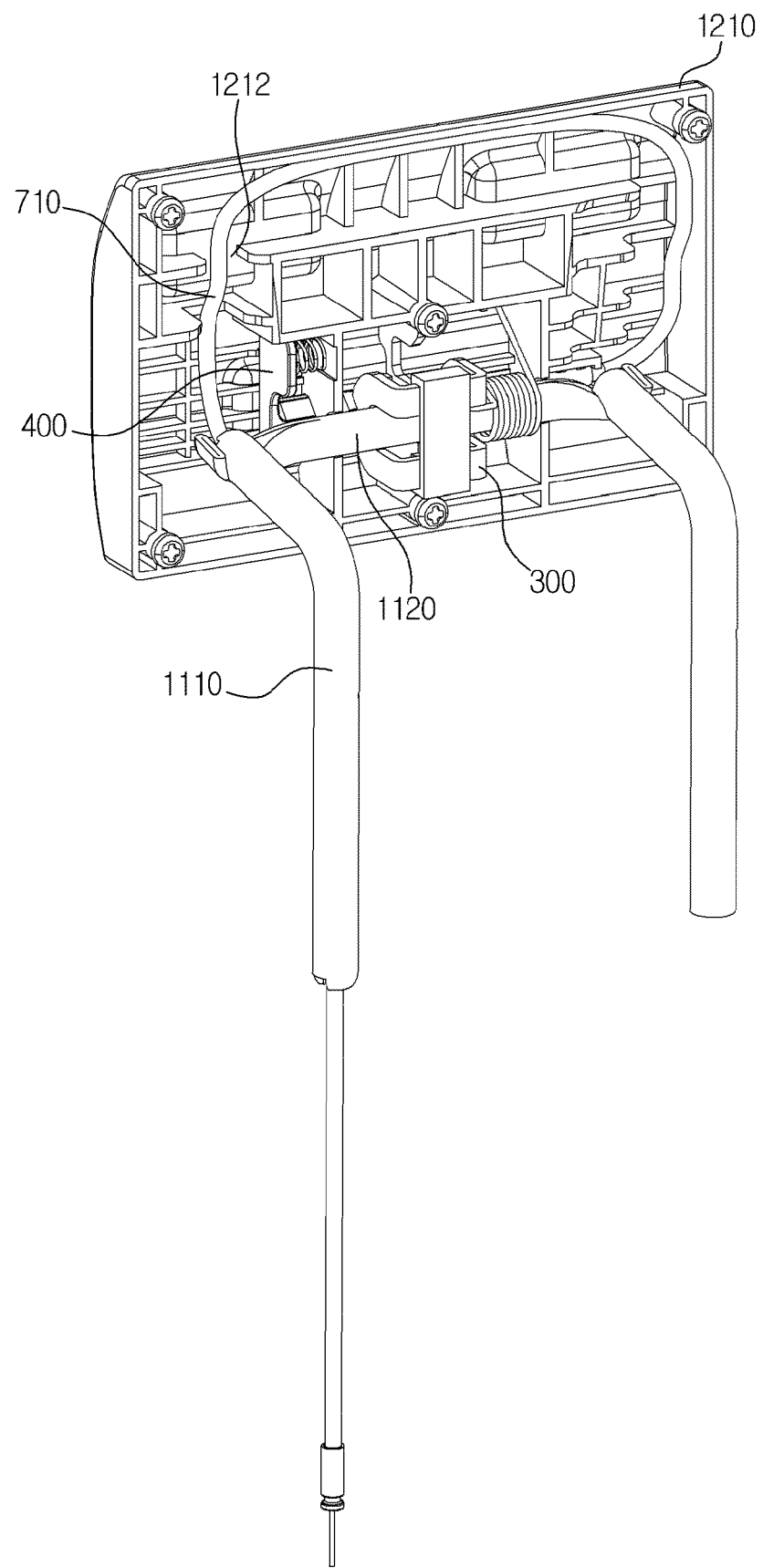

HEADREST CONTROLLING APPARATUS

TECHNICAL FIELD

The present invention relates to a headrest controlling apparatus, and more particularly, to a headrest controlling apparatus which includes a fixing groove formed in one of a first fixing member and a second fixing member in a lateral direction, and a fixing protrusion formed on the other one and inserted into the fixing groove, wherein the second fixing member includes a first fixing member insertion groove formed to pass therethrough in a rotational direction of the second member so that the first fixing member is inserted thereinto.

BACKGROUND ART

Generally, a vehicle headrest is installed at an upper end of a backrest of a seat so that the vehicle headrest serves as a cushion that comfortably supports the head of an occupant at ordinary times and supports the head to prevent the head from suddenly falling back so as to prevent a neck injury or the like when an accident occurs, and some of conventional headrests could control its position by rotating or tilting a headrest that supports a head according to convenience of a passenger.

A conventional headrest includes a supporting member configured to support an inverse U-shaped stay at a seat back to be lifted and configured to rotatably support a bracket which has a cross-section of a rectangle without one side and at which a headrest main body is installed on the stay, a rotation controlling member which includes a stopper and a locker formed in the bracket of a horizontal part of the stay and a locking part formed at a position facing the stopper and the locker, such that the stopper and the locker are engaged to or disengaged from each other, a rotation controlling coil spring wound between the bracket of the horizontal part of the stay and the stopper and having both ends supported at the bracket and the stopper, a locker pushing coil spring wound between the bracket of the horizontal part of the stay and the locker, and an operation rod formed at an upper portion of the bracket and including a knob installed to be exposed to a side of the headrest main body and having a portion opposite the knob connected to the locker.

However, the bracket, the stopper, and the locker of the conventional headrest have through holes into which the stay is inserted, and thus, it is difficult to assemble the stay, the bracket, the stopper, and the locker, and a structure is complicated. The knob should be pushed until the folding is finished, so that the locker is not returned, and thus it is inconvenient in use.

PRIOR-ART DOCUMENTS

Patent Documents (Patent Document 1) Korean Patent Laid-Open Publication No. 10-1274451

Disclosure of Invention

Technical Problem

A technical objective of the present invention is to provide a headrest controlling apparatus which has a simplified structure and increases convenience of use.

Solution to Problem

A headrest controlling apparatus according to the present invention includes: a first member connected to one of a seat and a headrest; a second member connected to the other one of the seat and the headrest and rotatably installed on the first member; a first fixing member installed on the first member; and a second fixing member installed in the second member to slide in a lateral direction and configured to fix a position of the headrest, wherein one of the first fixing member and the second fixing member includes a fixing groove formed in a lateral direction, and the other one includes a fixing protrusion which is inserted into the fixing groove, and the second fixing member includes a first fixing member insertion groove formed to pass therethrough in a rotational direction of the second member so that the first fixing member is inserted thereinto.

In the headrest controlling apparatus according to the present invention, it is characterized that the fixing protrusion and the fixing groove may be disposed forward or backward of a horizontally disposed rod of the stay rod.

In the headrest controlling apparatus according to the present invention, it is characterized that the second member may include a second fixing member insertion groove formed to pass therethrough in a lateral direction so that the second fixing member is inserted thereinto.

In the headrest controlling apparatus according to the present invention, it is characterized that the first member may be a stay rod, the second member may be a headrest cover, and a stay rod coupling part to which the stay rod is rotatably coupled may be formed in the headrest cover. The headrest cover may further include a main spring configured to return the headrest, wherein the main spring is provided as a coil spring, and the stay rod is inserted into the main spring, a second fixing member spring configured to return the second fixing member, wherein one end of the second fixing member spring is supported by the second member, and the other end thereof is supported by the second fixing member, and a button member configured to push the second fixing member, wherein the second fixing member spring is disposed collinear with a push rod of the button member.

In the headrest controlling apparatus according to the present invention, it is characterized that the first fixing member may include two side plates and a connecting plate configured to connect the two side plates, wherein each of the two side plates include a fixing groove formed therein, the two side plates are inserted into the first fixing member insertion grooves, a rod mounting part on which the stay rod is mounted is formed in the first fixing member, and a bumper is disposed between the first fixing member and the second member.

Advantageous Effects of Invention

The above-described headrest controlling apparatus has the following effects.

The headrest controlling apparatus includes a first fixing member installed on a first member, and a second fixing member installed in the second member to slide in a lateral direction and configured to fix a position of the headrest, wherein one of the first fixing member and the second fixing member includes a fixing groove formed in a lateral direction, the other one includes a fixing protrusion which is inserted into the fixing groove, and the second fixing member includes a first fixing member insertion groove formed to pass therethrough in a rotational direction of the second member so that the first fixing member is inserted thereinto, and thus has a simplified structure, and the first fixing member is fitted onto the first fixing member insertion groove when an occupant pushes the second fixing member to fold a headrest, and thus, convenience of use can be increased by not continuously pushing the second fixing member.

The fixing protrusion and the fixing groove are disposed forward or backward of a horizontally disposed rod of the stay rod, and thus a volume of the apparatus can be reduced.

The second member includes a second fixing member insertion groove formed to pass therethrough in a lateral direction so that the second fixing member is inserted thereinto, and thus the second fixing member can be easily assembled to the second member, and the second fixing member can be easily moved in the second member in a lateral direction.

The first member is a stay rod, the second member is a headrest cover, and the headrest cover includes a stay rod coupling part to which the stay rod is rotatably coupled and further includes a main spring configured to return the headrest, wherein the main spring is provided as a coil spring, and the stay rod is inserted into the main spring. The apparatus further includes a second fixing member spring configured to return the second fixing member, wherein one end of the second fixing member spring is supported by the second member, such that a structure of the apparatus can be more simplified, and the other end thereof is supported by the second fixing member. The apparatus further includes a button member configured to push the second fixing member, wherein the second fixing member spring is disposed collinear with a push rod of the button member. Thus, the second fixing member can easily slide and be returned.

The first fixing member includes two side plates and a connecting plate configured to connect the two side plates, each of the two side plates include a fixing groove formed therein, the two side plates are inserted into the first fixing member insertion grooves, the first fixing member includes a rod mounting part on which the stay rod is mounted, and thus a position of the headrest can be stably fixed, and a bumper is disposed between the first fixing member and the second member, and thus a gap and noise can be reduced.

BRIEF DESCRIPTION OF DRAWINGS

FIG. 1 is a perspective view of a headrest controlling apparatus according to a first exemplary embodiment of the present invention.

FIG. 2 is an exploded perspective view of the headrest controlling apparatus according to the first exemplary embodiment of the present invention when viewed from a front side.

FIG. 3 is an exploded perspective view of the headrest controlling apparatus according to the first exemplary embodiment of the present invention when viewed from a rear side.

FIG. 4 is a perspective view of the headrest controlling apparatus according to the first exemplary embodiment of the present invention when viewed from the front side (a first headrest cover is omitted).

FIG. 5 is a perspective view of the headrest controlling apparatus according to the first exemplary embodiment of the present invention when viewed from a rear side (a second headrest cover is omitted).

FIG. 6 is a perspective view of first and second members of the headrest controlling apparatus according to the first exemplary embodiment of the present invention when viewed from a rear side (an upright state).

FIG. 7 is a cross-sectional view of the headrest controlling apparatus according to the first exemplary embodiment of the present invention (an upright state).

FIG. 8 is a perspective view of the first and second members of the headrest controlling apparatus according to the first exemplary embodiment of the present invention when viewed from a front side (a folded state).

FIG. 9 is a cross-sectional view of the headrest controlling apparatus according to the first exemplary embodiment of the present invention (a folded state).

FIG. 10 is a perspective view of a headrest controlling apparatus according to a second exemplary embodiment of the present invention.

FIG. 11 is an exploded perspective view of the headrest controlling apparatus according to the second exemplary embodiment of the present invention when viewed from a front side.

FIG. 12 is a perspective view of the headrest controlling apparatus according to the second exemplary embodiment of the present invention when viewed from the front side (a first headrest cover is omitted).

FIG. 13 is a perspective view of the headrest controlling apparatus according to the second exemplary embodiment of the present invention when viewed from the rear side (a second headrest cover is omitted).

MODE FOR THE INVENTION

Hereinafter, exemplary embodiments of the present invention will be described in detail with reference to the accompanying drawings.

For reference, the components of the present invention which are the same as those in the related art will be described below with reference to the above-described related art, and the detailed description thereof will be omitted.

When it is described that any part is positioned "on" another part, it means that the part is directly on another part or above another part with at least one intervening part. In contrast, when any part is described to be positioned "directly on" another part, it means that there is no intervening part between the two parts.

Technical terms used herein are for only describing specific embodiments and are not intended to limit the present invention. Singular forms used herein include plural forms unless explicitly described to the contrary. A meaning of "comprising" used in the specification embodies specific characteristics, areas, integers, steps, operations, elements, and/or components, and does not exclude the presence or addition of other characteristics, areas, integers, steps, operations, elements, and/or components.

Terms representing a relative space such as "lower," "upper," and the like may be used for more easily describing a relationship with another part of a part shown in the drawings. Such terms are intended to include other meanings or operations of an apparatus used together with a meaning that is intended in the drawings. For example, when an apparatus is inverted in the drawings, any part described as disposed at a "lower" part of another part is described as being disposed at an "upper" part of another part. Therefore, the illustrative term "lower" includes both upper and lower directions. An apparatus may be rotated by 90° or another angle, and the terms representing the relative space are accordingly analyzed.

When it is described that any element is "connected" to another element, it should be understood that the element is directly connected to another element or still another element may be interposed therebetween.

First Embodiment

A headrest controlling apparatus according to a first exemplary embodiment of the present invention is an apparatus for folding a headrest backward.

As illustrated in FIGS. 1 to 9, the headrest controlling apparatus of the first exemplary embodiment of the present invention includes a first member connected to one of a seat (not shown) or a headrest (not shown), a second member connected to the other one of the seat or the headrest and rotatably installed on the first member, a first fixing member 300 formed on the first member, and a second fixing member 400 installed in the second member to slide in a lateral direction and configured to fix a position of the headrest. One of the first fixing member 300 and the second fixing member 400 includes a fixing groove 321 formed in a lateral direction, and the other one thereof includes a fixing protrusion 401 inserted into the fixing groove 321, wherein the second fixing member 400 includes a first fixing member insertion groove 411 formed to pass therethrough in a rotational direction of the second member so that the first fixing member 300 is inserted thereinto.

Hereinafter, a width direction of a vehicle is referred to as a lateral direction, a longitudinal direction of the vehicle is referred to as a front-rear direction, and a vertical direction of the vehicle is referred to as a vertical direction. Specifically, a side, which is adjacent to a head of a passenger, is referred to as a front side, and the opposite side is referred as a rear side.

In the exemplary embodiment of the present invention, the first member is connected to the seat, and the second member is connected to the headrest. Unlike the description, the first member may be connected to the headrest, and the second member may be connected to the seat.

As illustrated in FIG. 1, in the exemplary embodiment of the present invention, the first member is provided as a stay rod 100, and the second member is provided as a headrest cover 200.

The stay rod 100 includes a first rod 110 vertically disposed and a second rod 120 disposed above the first rod 110 horizontally in a lateral direction. The first rod 110 and the second rod 120 are made of a hollow pipe. The first rod 110 and the second rod 120 may be integrally formed or separately formed. In the exemplary embodiment of the present invention, the first rod 110 and the second rod 120 are integrally formed. An inclined part 111 is disposed at an upper end of the first rod 110 so that the second rod 120 is disposed forward of the first rod 110. The inclined part 111 is disposed so that its height increases forward.

The headrest cover 200 is rotatably installed at the stay rod 100.

The headrest cover 200 is formed to correspond to a headrest shape. The headrest is formed by the headrest cover 200 surrounded by a cushion (not shown).

The headrest cover 200 is formed of a synthetic resin and is manufactured in an injection-molding manner.

The headrest cover 200 includes a front surface, a rear surface, an upper surface, a lower surface, and both side surfaces to cover the second rod 120 of the stay rod 100 and upper and lower portions and front and rear sides of the first and second fixing members 300 and 400 described below. That is, the headrest cover 200 is formed to surround upper and lower portions and front and rear sides of the apparatus.

The headrest cover 200 is divided at least into a first headrest cover 210 and a second headrest cover 220.

The first headrest cover 210 is disposed in front of the second headrest cover 220. That is, a front surface of the headrest cover 200 is formed at the first headrest cover 210, and a rear surface of the headrest cover 200 is formed at the second headrest cover 220. The upper and lower surfaces and the side surfaces of the headrest cover 200 may be formed at one of the first headrest cover 210 and the second headrest cover 220 or may be divided and formed at both sides thereof. In the exemplary embodiment of the present invention, the upper and lower surfaces and the side surfaces of the headrest cover 200 are divided into two and formed at the first headrest cover 210 and the second headrest cover 220.

Each of the first headrest cover 210 and the second headrest cover 220 is integrally formed.

A stay rod coupling part to which the second rod 120 of the stay rod 100 is rotatably coupled is formed in the headrest cover 200. That is, the headrest cover 200 is directly connected to the stay rod 100 to be rotatable. Thus, the stay rod 100 is directly connected to the headrest cover 200 without other components, and a distance from a center of the second rod 120 to a front lower edge is shorter than that of a conventional apparatus.

A through hole into which the second rod 120 is inserted is formed in the stay rod coupling part to pass therethrough in a lateral direction.

At least one separation part is formed in the stay rod coupling part, and the through hole may communicate with the outside. The separation part allows the second rod 120 to be inserted into the through hole, and the second rod 120 may be coupled to the headrest cover 200 without separation of the first rod 110 and the second rod 120. That is, assembling can be easily performed.

The stay rod coupling part is divided and formed at the first headrest cover 210 and the second headrest cover 220. That is, the stay rod coupling part is formed by dividing into a first stay rod coupling part 211 and a second stay rod coupling part 221. The first stay rod coupling part 211 is integrally formed with the first headrest cover 210, and the second stay rod coupling part 221 is integrally formed with the second headrest cover 220. The first stay rod coupling part 211 and the second stay rod coupling part 221 are formed in a rib shape, the first stay rod coupling part 211 is formed in a rearward protruding plate shape, and the second stay rod coupling part 221 is formed in a forward protruding plate shape. The first stay rod coupling part 211 is disposed in front of the second rod 120, and the second stay rod coupling part 221 is disposed behind the second rod 120. Therefore, two separation parts are formed in the stay rod coupling part and are formed as an upper portion and a lower portion of the stay rod coupling part. Thus, the through hole is divided and formed at the first headrest cover 210 and the second headrest cover 220. A part of the through hole of the first stay rod coupling part 211 has an open rear side, and the other part of the through hole formed at the second stay rod coupling part 221 has an open front side.

The first stay rod coupling part 211 and the second stay rod coupling part 221 are coupled to each other when the first headrest cover 210 and the second headrest cover 220 are coupled to each other.

The stay rod coupling parts are formed at both lower portions of the first headrest cover 210 and the second headrest cover 220.

First and second fastening parts 215 and 225 are formed at the first headrest cover 210 and the second headrest cover 220 so that the first headrest cover 210 and the second headrest cover 220 are coupled to each other. A bolt is fastened to each of the first and second fastening parts 215 and 225.

A first fixing member insertion space is formed between the stay rod coupling parts on both sides of the headrest cover 200. The first fixing member insertion space is divided and formed at the first headrest cover 210 and the second headrest cover 220. The first and second fixing members 300 and 400 described below are disposed in the first fixing member insertion space.

Incised parts 226 into which the first rod 110 is inserted are formed at both sides of the second headrest cover 220. The incised parts 226 are formed to pass through the second headrest cover 220 in a front-rear direction. The incised parts 226 are formed so that the second stay rod coupling part 221 and the first fixing member insertion space are disposed between the incised parts 226. The incised parts 226 allow the headrest cover 200 not to interfere with the first rod 110 when the headrest is folded.

A button member installation part in which the button member 530 is installed is installed at a right side surface of the first headrest cover 210. The button member installation part includes a button member through hole formed to pass therethrough in a lateral direction.

A second fixing member insertion groove 218 into which the second fixing member 400 is inserted is formed at the first headrest cover 210 of the headrest cover 200 to pass therethrough in a lateral direction.

The second fixing member insertion groove 218 is formed at the first stay rod coupling parts 211 disposed at a right side of the first headrest cover 210 and at an additional stay rod coupling part 211a interposed between the first stay rod coupling parts 211 on both sides of the first headrest cover 210. The second fixing member insertion groove 218 is formed to correspond to a cross-sectional shape of the second fixing member 400 so that the second fixing member 400 is not moved in a vertical direction and a front-rear direction of the headrest cover 200. The additional stay rod coupling part 211a has a through hole formed to pass therethrough in a lateral direction so that a front side of the second rod 120 is inserted thereinto. The second fixing member insertion groove 218 is disposed forward of the through hole.

Further, a contact rib 217 is formed at a portion with which a front surface of the second fixing member 400 is in contact of an inner wall of the first headrest cover 210 in a lateral direction. The contact rib 217 minimizes friction when the second fixing member 400 slides so as to facilitate operation thereof and reduce noise. The second fixing member insertion groove 218 is formed between the contact rib 217 and the first stay rod coupling part 211.

Further, a guide protruding part is formed long in a lateral direction at upper and/or lower portions of the second fixing member 400 on an inner wall of the first headrest cover 210 to guide the second fixing member 400.

An inclined part seating groove 229 is formed in a rear side of the second headrest cover 220 to communicate with the incised part 226. The inclined part seating groove 229 has an open rear side, and the inclined part 111 is seated on the inclined part seating groove 229.

The first fixing member 300 is provided separately from the stay rod 100 and is fixed to a center of the second rod 120 of the stay rod 100. The first fixing member 300 is directly connected to the stay rod 100 without other components. The first fixing member 300 is formed of a metal material and may be installed on the second rod 120 through welding.

The first fixing member 300 includes two side plates 320 and a connecting plate 310 connecting the two side plates 320. The side plates 320 are formed to protrude forward at both sides of the connecting plate 310.

The first fixing member 300 is installed on the second rod 120 so that the connecting plate 310 is perpendicularly disposed.

The first fixing member 300 includes a rod mounting part 301 on which the second rod 120 is mounted. The rod mounting part 301 passes through the first fixing member 300 in a lateral direction. The rod mounting part 301 is formed in the connecting plate 310 and the side plates 320. That is, a rear side of the rod mounting part 301 is open. Further, the rod mounting part 301 may maximize a contact area between the first fixing member 300 and the second rod 120.

The rod mounting part 301 is formed at a central portion of the connecting plate 310. Therefore, a lower end of the connecting plate 310 is disposed below a lower end of the second rod 120.

The connecting plate 310 is disposed more backward than the second rod 120.

The stay rod coupling part 211a is disposed between the two side plates 320.

The main spring 600 is disposed at the left side of the first fixing member 300. The main spring 600 is provided to return the headrest cover 200 and the headrest to the original position (folding position). The main spring 600 is provided as a coil spring, and the second rod 120 of the stay rod 100 is fitted onto the coils of the main spring 600. One end of the main spring 600 is supported at the first headrest cover 210, and the other end thereof is supported at the first fixing member 300. The other end of the main spring 600 is inserted into the rod mounting part of the first fixing member 300.

A bumper insertion groove into which a part of a bumper 900 described below is inserted is formed to pass through the center of an upper portion of the connecting plate 310 in a front-rear direction. An upper portion of the bumper insertion groove is open.

A fixing groove 321 is formed in one of the first and second fixing members 300 and 400 described below in a lateral direction, and a fixing protrusion 401 inserted into the fixing groove 321 is formed on the other one. In the exemplary embodiment of the present invention, the fixing groove 321 is formed in the first fixing member 300, and the fixing protrusion 401 is formed at the second fixing member 400. Unlike the description, the fixing groove may be formed in the second fixing member, and the fixing protrusion may be formed on the first fixing member.

The fixing grooves 321 are formed in a front side of the side plates 320 on both sides of the first fixing member 300. The fixing grooves 321 are formed to pass through the side plates 320 in a lateral direction and have closed rear sides and upper and lower portions.

When applied to the folding apparatus as described in the exemplary embodiment, the apparatus may include one fixing groove 321, but when applied to the tilting apparatus, the apparatus may include several fixing grooves 321.

The fixing protrusion 401 and the fixing grooves 321 are disposed forward or backward of the horizontally disposed second rod 120 of the stay rod 100. That is, the fixing grooves 321 are disposed forward or backward of a rotation center of the headrest cover 200. Specifically, the fixing grooves 321 are disposed to be separated from the rotation center of the headrest cover 200 in a front-rear direction. In the exemplary embodiment of the present invention, the fixing grooves 321 are disposed forward of the rotation center of the headrest cover 200.

When the headrest cover 200 rotates about the stay rod 100 in the first fixing member 300, a contact surface 302, which is a position with which the second fixing member 400 comes in contact, has a circular arc shape. The contact surfaces 302 are formed at front ends of the two side plates. The contact surfaces 302 are formed convex forward.

The second fixing member 400 is installed in the headrest cover 200 to slide in a lateral direction. The second fixing member 400 is fitted onto the second fixing member insertion groove 218 and installed in the headrest cover 200 to slide in a lateral direction. That is, the second fixing member 400 is directly connected with the headrest cover 200 without other components. The second fixing member 400 has an approximately bar-shape.

The second fixing member 400 includes a fixing member main body 410 disposed in a lateral direction and a pushing part 420 protruding upward from a right end of the fixing member main body 410.

The fixing member main body 410 has a flat front surface and has a fixing protrusion 401 formed at a rear surface thereof to protrude backward.

The fixing protrusion 401 is formed long in a lateral direction, and inclined surfaces are formed at upper and lower portions. The fixing protrusion 401 is formed to have a vertical width decreasing toward the rear. The fixing groove 321 is formed to correspond to a shape of the fixing protrusion 401. The fixing protrusion 401 may be integrally formed with the second fixing member 400, or may be assembled to the second fixing member 400 using a separate pin. Thus, in the case when the fixing protrusion 401 is assembled to the second fixing member 400, the fixing protrusion 401 may be formed of a material different from that of the second fixing member 400. For example, the fixing protrusion 401 is made of a more durable material than that of the second fixing member 400, such that the apparatus can be formed lightweight and more durable.

The second fixing member 400 includes a first fixing member insertion groove 411 formed to pass therethrough in a rotational direction of the headrest cover 200 so that the first fixing member 300 is inserted thereinto. In the exemplary embodiment of the present invention, the first fixing member insertion groove 411 is formed to vertically pass through the second fixing member 400, and has a closed front side and an open rear side. The first fixing member insertion groove 411 has a circular arc shape. The first fixing member insertion grooves 411 into which the two side plates 320 are inserted are each formed at both sides of a rear surface of the fixing member main body 410. The fixing protrusion 401, the first fixing member insertion groove 411, the fixing protrusion 401, the first fixing member insertion groove 411, and the fixing protrusion 401 are formed at a rear surface of the fixing member main body 410 sequentially from the right.

The pushing part 420 has a planar shape and has a spring separation preventing protrusion formed to protrude toward the left.

The second fixing member 400 further includes a second fixing member spring 800 for returning the second fixing member 400. The second fixing member spring 800 is provided as a coil spring. One end of the second fixing member spring 800 is supported by the headrest cover 200, and the other end thereof is supported by the second fixing member 400. Specifically, one end of the second fixing member spring 800 is seated in the spring seating groove 216 formed at an upper portion of the first stay rod coupling part 211 of the first headrest cover 210, and the other end thereof is supported by the pushing part 420. The spring separation preventing protrusion is inserted into the other end of the second fixing member spring 800. The second fixing member spring 800 is disposed above the fixing member main body 410.

The first stay rod coupling part 211 in which the spring seating groove 216 is installed functions as a stopper to prevent the second fixing member 400 from excessively moving.

Further, the bumper 900 is disposed between the first fixing member 300 and the headrest cover 200. The bumper 900 is installed at a rear side of the first fixing member 300. Specifically, the bumper 900 is installed at the center of the connecting plate 310 in a vertical direction. The bumper 900 includes insertion grooves formed at front upper portion and a front lower portion thereof so that upper and lower ends of the connecting plate 310 are inserted thereinto. The insertion grooves prevent the bumper 900 from vertically moving. An insertion protrusion which is inserted into the bumper insertion groove formed in the connecting plate 310 is formed in the upper insertion groove. The insertion protrusions prevent the bumper 900 from laterally moving. When the headrest is upright, a lower portion of the bumper 900 is disposed between the connecting plate 310 of the first fixing member 300 and the second headrest cover 220. The bumper 900 may reduce a gap and noise.

When the headrest is upright, the headrest cover 200 is supported at a rear side of the first fixing member 300 to prevent a load from being concentrated on the second fixing member 400.

Further, the apparatus may further include an operating member configured to slide the second fixing member 400.

The operating member is provided at the headrest cover 200 as a button member 530 including a button and installed to slide in a lateral direction.

The button member 530 includes a bezel 531 installed at the button member installation part and the button slidably fitted onto the bezel 531. The button member 530 further includes a button spring configured to return the button.

The button is installed at the bezel 531 to slide in a lateral direction of the headrest cover 200.

The button includes a pushing part 534a having a planar-shaped and a pushing rod 534d protruding from the pushing part 534a toward the left.

The pushing rod 534d is integrally formed with the button.

The pushing rod 534d pushes the pushing part 420 of the second fixing member 400.

The pushing rod 534d may be disposed collinear with the second fixing member spring 800.

Hereinafter, operation of the embodiment of the present invention having the above-described configuration will be described.

When an occupant pushes the pushing part 534a of the button member 530 to fold the upright headrest as illustrated in FIGS. 6 and 7, the pushing rod 534d of the button pushes the pushing part 420 of the second fixing member 400.

The second fixing member 400 is moved to the left. Thus, the two side plates 320 are inserted into the first fixing member insertion grooves 411, and the headrest cover 200 may be rotatable about the stay rod 100. Through this process, the headrest is unfixed. The unfixed headrest is rotated to a folding position (a rear side) by the elastic force of the main spring 600.

The headrest rotates until the inclined part 111 of the stay rod 100 is seated in the inclined part seating groove 229 of the second headrest cover 220.

Even when the button is not continuously pushed in the process of unfixing, the side plates 320 are fitted onto the first fixing member insertion grooves 411 as soon as the button is pushed once, such that the headrest is easily folded.

When the folded headrest is unfolded so as to become upright as illustrated in FIGS. 8 and 9, the headrest is pushed forward to rotate in a counterclockwise direction, and the fixing protrusion 401 and the fixing groove 321 are in a line. Then, the second fixing member 400 is moved to the right by the elastic force of the second fixing member spring 800. Thus, the fixing protrusion 401 is inserted into the fixing groove 321. Thus, when the fixing protrusion 401 is inserted into the fixing groove 321, the headrest is not rotated even when pushed forward.

Second Embodiment

A headrest controlling apparatus according to a second exemplary embodiment of the present invention is an apparatus for folding a headrest.

As shown in FIGS. 10 to 13, a headrest controlling apparatus according to a second embodiment of the present invention includes a first member connected to one of a seat (not shown) and a headrest (not shown), a second member connected to the other one of the seat and the headrest and rotatably installed at the first member, and a first fixing member 300 formed on the first member, and a second fixing member 400 installed in the second member to slide in a lateral direction and configured to fix a position of the headrest. One of the first fixing member 300 and the second fixing member 400 includes a fixing groove laterally formed therein, and the other one includes a fixing protrusion which is inserted into the fixing groove. The second fixing member 400 includes a first fixing member insertion groove formed to pass therethrough in a rotational direction of the second member so that the first fixing member 300 is inserted thereinto. The headrest controlling apparatus further includes an operation member configured to slide the second fixing member 400, and the operation member includes a wire 710.

Detailed descriptions will be omitted for components which are the same as those in the above-described embodiment.

In the exemplary embodiment of the present invention, the first member is provided as a stay rod 1100, and the second member is provided as a headrest cover 1200.

A first rod 1110 and a second rod 1120 of the stay rod 1100 in the exemplary embodiment of the present invention are separately formed and are coupled to each other through welding.

An inlet hole 101 is formed in one side (a right side) of the first rod 1110 so that a front side thereof is open.

The headrest cover 1200 includes a first headrest cover 1210 and a second headrest cover 1220.

The operating member is provided as the wire 710. One end of the wire 710 is connected to a left rear surface of the fixing member main body of the second fixing member 400, and the other end is connected to a seat side through the stay rod 1100. The first headrest cover 1210 includes a wire guide part 1212 configured to guide the wire 710. The wire 710 passes through the first stay rod coupling part disposed at the left side of the first headrest cover 210, is guided by the wire guide part 1212, is introduced into the inlet hole 101, and is drawn out from a lower end of the first rod 1110.

When an occupant pulls the wire 710 to fold the headrest in an upright state, the second fixing member 400 is moved to the left, the two side plates 320 are fitted onto the first fixing member insertion grooves 411, and the headrest cover 200 is rotatable about the stay rod 100. Therefore, the headrest is folded.

Since the process of unfolding the headrest so as to become upright is the same as in the above-described embodiment, the detailed descriptions will be omitted.

The wire 710 and the button member 530 may be simultaneously provided as the operating member.

While the present invention has been described with reference to the exemplary embodiments, it may be understood by those skilled in the art that various changes and modifications may be made without departing from the spirit and scope of the present invention as defined by the appended claims.

DESCRIPTION OF SYMBOLS

Description of Symbols for Main Parts in Drawings

100: STAY ROD, 101: INLET HOLE
110: FIRST ROD, 111: INCLINED PART
120: SECOND ROD, 200: HEADREST COVER
210: FIRST HEADREST COVER, 211: FIRST STAY ROD COUPLING PART
215: FIRST FASTENING PART, 216: SPRING SEATING GROOVE
217: CONTACT RIB
218: SECOND FIXING MEMBER INSERTION GROOVE
220: SECOND HEADREST COVER
221: SECOND STAY ROD COUPLING PART
225: SECOND FASTENING PART, 226: INCISED PART
229: INCLINED PART SEATING GROOVE
300: FIRST FIXING MEMBER
301: ROD MOUNTING PART, 302: CONTACT SURFACE
310: CONNECTING PLATE, 320: SIDE PLATE
321: FIXING GROOVE, 400: SECOND FIXING MEMBER
401: FIXING PROTRUSION, 410: FIXING MEMBER MAIN BODY
411: FIRST FIXING MEMBER INSERTION GROOVE
420: PUSHING PART, 530: BUTTON MEMBER
531: BEZEL, 534a: PUSHING PART
534d: PUSHING ROD, 600: MAIN SPRING
710: WIRE, 800: SECOND FIXING MEMBER SPRING
900: BUMPER

The invention claimed is:

1. A headrest controlling apparatus comprising:
a first member connected to one of a seat and a headrest;
a second member connected to the other one of the seat and the headrest and rotatably installed on the first member;
a first fixing member installed on the first member; and
a second fixing member installed in the second member to slide in a lateral direction and configured to fix a position of the headrest,
wherein one of the first fixing member and the second fixing member includes a fixing groove formed in a lateral direction, and the other of the first fixing member and the second fixing member includes a fixing protrusion which is inserted into the fixing groove, and the second fixing member includes a first fixing member insertion groove formed to pass therethrough in a rotational direction of the second member so that the first fixing member is inserted thereinto.

2. The headrest controlling apparatus according to claim 1, wherein the fixing protrusion and the fixing groove are disposed forward or backward of a horizontally disposed rod of a stay rod.

3. The headrest controlling apparatus according to claim 1, wherein the second member includes a second fixing member insertion groove formed to pass therethrough in a lateral direction so that the second fixing member is inserted thereinto.

4. The headrest controlling apparatus according to claim 1, wherein the first member is a stay rod, the second member is a headrest cover, and a stay rod coupling part to which the stay rod is rotatably coupled is formed in the headrest cover,
wherein the headrest cover further includes:
a main spring configured to return the headrest, wherein the main spring is provided as a coil spring, and the stay rod is inserted into the main spring;
a second fixing member spring configured to return the second fixing member, wherein one end of the second fixing member spring is supported by the second member, and the other end thereof is supported by the second fixing member; and
a button member configured to push the second fixing member, wherein the second fixing member spring is disposed collinear with a push rod of the button member.

5. The headrest controlling apparatus according to claim 1, wherein:
the first fixing member includes two side plates and a connecting plate configured to connect the two side plates;
each of the two side plates include a fixing groove formed therein;
the two side plates are inserted into the first fixing member insertion grooves;
a rod mounting part on which the stay rod is mounted is formed in the first fixing member; and
a bumper is disposed between the first fixing member and the second member.

\* \* \* \* \*